United States Patent
Choi et al.

(10) Patent No.: US 9,025,769 B2
(45) Date of Patent: May 5, 2015

(54) METHOD OF REGISTERING SMART PHONE WHEN ACCESSING SECURITY AUTHENTICATION DEVICE AND METHOD OF GRANTING ACCESS PERMISSION TO REGISTERED SMART PHONE

(75) Inventors: Yeon Gil Choi, Seongnam-si (KR); Seong Jik Lee, Yongin-si (KR); Jae Won Lee, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 343 days.

(21) Appl. No.: 13/197,121

(22) Filed: Aug. 3, 2011

(65) Prior Publication Data

US 2012/0300927 A1    Nov. 29, 2012

(30) Foreign Application Priority Data

May 25, 2011  (KR) .................. 10-2011-0049785

(51) Int. Cl.
  *H04W 12/06*  (2009.01)
  *H04W 12/04*  (2009.01)
  *H04L 29/06*  (2006.01)
(52) U.S. Cl.
  CPC ........... *H04W 12/06* (2013.01); *H04L 63/0876* (2013.01); *H04W 12/04* (2013.01)
(58) Field of Classification Search
  CPC .................................................. H04L 63/0876
  USPC ............ 380/247, 249; 713/155, 182; 726/2–7
  See application file for complete search history.

(56) References Cited

U.S. PATENT DOCUMENTS

| | | | | |
|---|---|---|---|---|
| 6,198,823 B1 * | 3/2001 | Mills | | 380/247 |
| 6,460,138 B1 * | 10/2002 | Morris | | 713/184 |
| 6,611,913 B1 * | 8/2003 | Carroll et al. | | 713/171 |
| 7,444,513 B2 * | 10/2008 | Nyman et al. | | 713/169 |
| 7,844,267 B2 * | 11/2010 | Sawada et al. | | 455/435.1 |
| 7,865,939 B2 * | 1/2011 | Schuster | | 726/4 |
| 8,205,080 B2 * | 6/2012 | Calamera et al. | | 713/168 |
| 8,417,218 B2 * | 4/2013 | Cofta | | 455/411 |
| 2003/0188201 A1 * | 10/2003 | Venkataramappa | | 713/202 |
| 2004/0023689 A1 * | 2/2004 | Ahonen | | 455/558 |
| 2005/0195975 A1 * | 9/2005 | Kawakita | | 380/30 |
| 2008/0003980 A1 * | 1/2008 | Voss et al. | | 455/411 |
| 2008/0212783 A1 * | 9/2008 | Oba | | 380/279 |
| 2009/0068988 A1 * | 3/2009 | Cofta | | 455/411 |
| 2010/0135491 A1 * | 6/2010 | Bhuyan | | 380/247 |
| 2010/0332832 A1 * | 12/2010 | Wu et al. | | 713/169 |
| 2011/0070877 A1 * | 3/2011 | Macaluso | | 455/419 |

FOREIGN PATENT DOCUMENTS

KR  10-2008-0104180    12/2008

* cited by examiner

*Primary Examiner* — Linglan Edwards
(74) *Attorney, Agent, or Firm* — NSIP Law

(57) ABSTRACT

A method for registering a Smartphone when accessing security authentication device and a method for access authentication of a registered Smartphone are provided. When a Smartphone based application searches for a device and attempts an access to the found device, the search and access for the device is limited according to a result of authentication using an activation code.

19 Claims, 5 Drawing Sheets

METHOD OF REGISTERING SMART PHONE WHEN ACCESSING SECURITY AUTHENTICATION DEVICE AND METHOD OF GRANTING ACCESS PERMISSION TO REGISTERED SMART PHONE

CROSS-REFERENCE TO RELATED APPLICATION

This application claims the benefit under 35 U.S.C. §119 (a) of Korean Patent Application No. 10-2011-0049785, filed on May 25, 2011, the disclosure of which is incorporated by reference in its entirety for all purposes.

BACKGROUND

1. Field

The following description relates to a security authentication technology, and more particularly, to a technology capable of controlling a security authentication device search and access by a Smartphone.

2. Description of the Related Art

In recent years, as Smartphones have been propagated widely, application services using Smartphone is garnering a large amount of interest. One of the application services is provided to obtain an entry permission by use of a Smartphone having an access to a security authentication device, such as an admission assiduity terminal or an entry control device. A security issue has been highly regarded in association with increasing use of such a Smartphone based application service.

However, even if a Smartphone does not have an access authentication for a device, if the Smartphone uses the same communication protocol as the device, the Smartphone can access the device, showing vulnerability of the security of the device. Accordingly, there is a need for a technology capable of ensuring the security.

SUMMARY

In one aspect, there is provided a technology capable of registering a Smartphone getting an access to a device, such as an admission assiduity terminal or an entry control device, authenticating the registered Smartphone and thus controlling a device search and access by the Smartphone.

In one general aspect, there is provided a method of registering a Smartphone trying to get access to a security authentication device in a management server. The method is as follows. An activation code, which is used to authenticate the Smartphone when the Smartphone accesses the security authentication device, is generated by use of unique information about the Smartphone. The generated activation code is registered by distributing the generated activation code to the Smartphone and the security authentication device.

The generating of the activation code is achieved through a block cipher of performing a symmetric key cipher operation in a block unit that is preliminarily determined.

The activation code includes a first cryptic code and a second cryptic code. The generating of the activation code includes generating the first cryptic code by encrypting the unique information about the Smartphone by use of an internally-defined key, and generating the second cryptic code by encrypting the first cryptic code by use of an activation code password that is received from the Smartphone.

The activation code includes a first cryptic code and a second cryptic code. The registering of the generated activation code by distributing the generated activation code to the Smartphone and the security authentication device comprises distributing the first cryptic code to the Smartphone, and distributing the second cryptic code to the security authentication device.

In another general aspect, there is provided a method of granting an authentication to a Smartphone trying to get access to a security authentication device. The method is as follows. An activation code of the Smartphone is primarily authenticated by checking unique information about the Smartphone through a Smartphone application. An activation code password is requested from a user of the Smartphone and the requested activation code password is received from the user. The activation code is secondarily authenticated by transmitting the activation code password to the security authentication device.

As described above, when a Smartphone based application searches for a device, such as an admission assiduity terminal or an entry control device, through a wireless communication network or a mobile communication network and attempts an access to the found device, the search and access to the device is limited according to a result of authentication using an activation code.

In addition, even when a use has lost a Smartphone, a third party who does not know an activation code password fails to get access to the admission assiduity terminal and the entry control device. In addition, a limit on password input attempts is set such that the activation code is expired if the number of the password input attempts exceeds the limit.

In addition, if an activation code of a registered Smartphone is transplanted to another Smartphone, it is compared whether the IMEI and ICCID of the other Smartphone corresponds to an activation code related information that is stored in the management server. If the IMEI and ICCID of the other Smartphone does not correspond to the activation code related information, a device access by the other Smartphone is not permitted. In the case of an illegal copy mobile phone having the same IMEI, ICCID and activation code as those of an original phone, an access authentication is limited by use of an activation code password.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
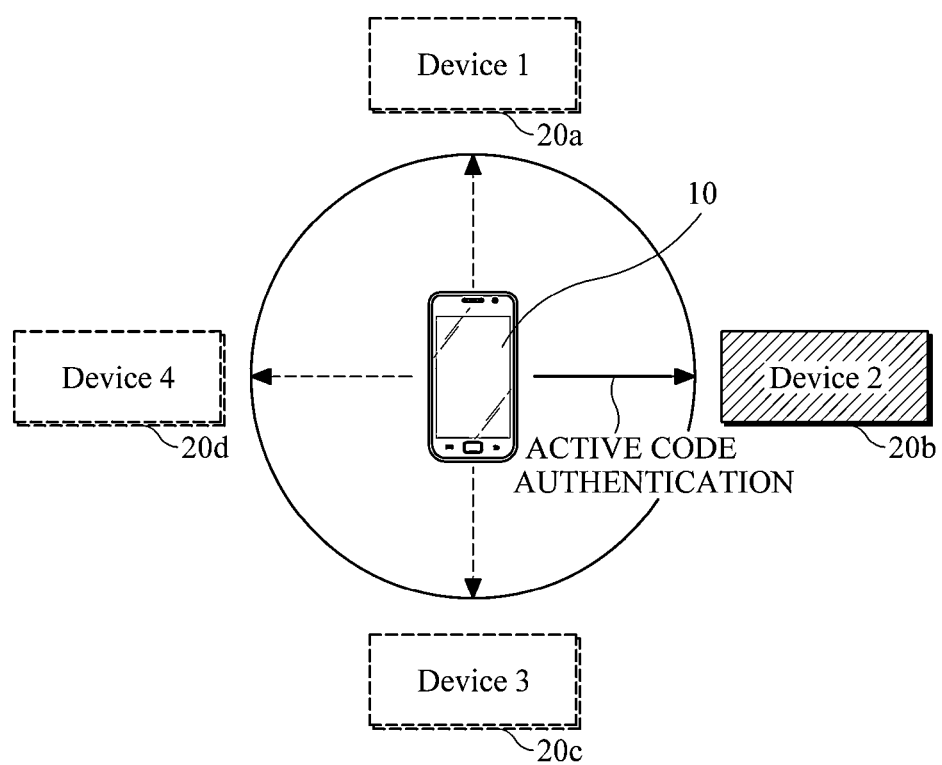
FIG. 1 shows an example of a device search and access by a Smartphone using an authentication.

FIG. 1 shows an example of a device search and access by a Smartphone using of an authentication.

As shown in FIG. 1, if a security authentication device, such as an admission assiduity terminal or an entry control device, is searched by a Smartphone based application, and an access to the searched security authentication device is made, the access is limited according to a result of an authentication.

In general, even if a Smartphone does not have an authentication for access to a device, the Smartphone may have access to the device through the same protocol as that of the device. As an example proposed to improve such a security vulnerability, the present invention prevents an unauthorized and unregistered Smartphone from having access to a device by performing an authentication process on a Smartphone.

The example uses an activation code to perform authentication on a Smartphone. The activation code represents a key used to obtain an authentication from a device when a Smartphone attempts to get access to the device. The activation code includes the range of searchable devices and the control authorization information. In addition, the activation code is generated by use of unique information about a Smartphone. The unique information about a Smartphone may be at least one of an International Mobile Equipment Identity (IMEI), an Integrated circuit card identifier (ICCID), a Subscriber Identity Module Serial Number (SSN) and an Unique Device Identifier (UDID).

In detail, the IMEI having 15 to 17 digits long is a unique identifier number that is allocated to a mobile terminal when manufactured. The location of a user of the mobile terminal may be tracked through the IMEI. In addition, a mobile terminal may be copied through the IMEI number.

A subscriber identity module (SIM) card is implemented as a 2G type using SIM serial number (SSN) and a 3G type having the ICCID printed thereon. Such a SIM card is used to identify a country or a mobile operator. Also, a mobile operator uses the SIM card as data for subscriber identification.

For the SSN or ICCID, the first 3 digits represent the mobile country code (MCC), the next 2 digits represent the mobile network code (MNC), i.e. the mobile operator, and the next 12 digits represent a serial number. The left most 2 digits of the serial number are used to identify a home location register (HLR). The twentieth digit represents a checksum. The ICCID layout is based on ISO/IEC 7812. The ICCID number is up to 20 digits long, preferably 19 digits long. Meanwhile, the UDID (iOS only) is a device identifier and is composed of 40 digits long.

As shown in FIG. 1, a Smartphone 10 can get a search and access only for a second Device 20b having an activation code registered. Meanwhile, the Smartphone 10 is denied a search and access for a first Device 20a, a third Device 20c and a fourth Device 20d that do not have a registered activation code. Accordingly, even if a Smartphone, which is not authenticated for search and access, attempts a search and an access for a device by use of the is same communication protocol as the device, the attempt is forbidden.

Figure 2:
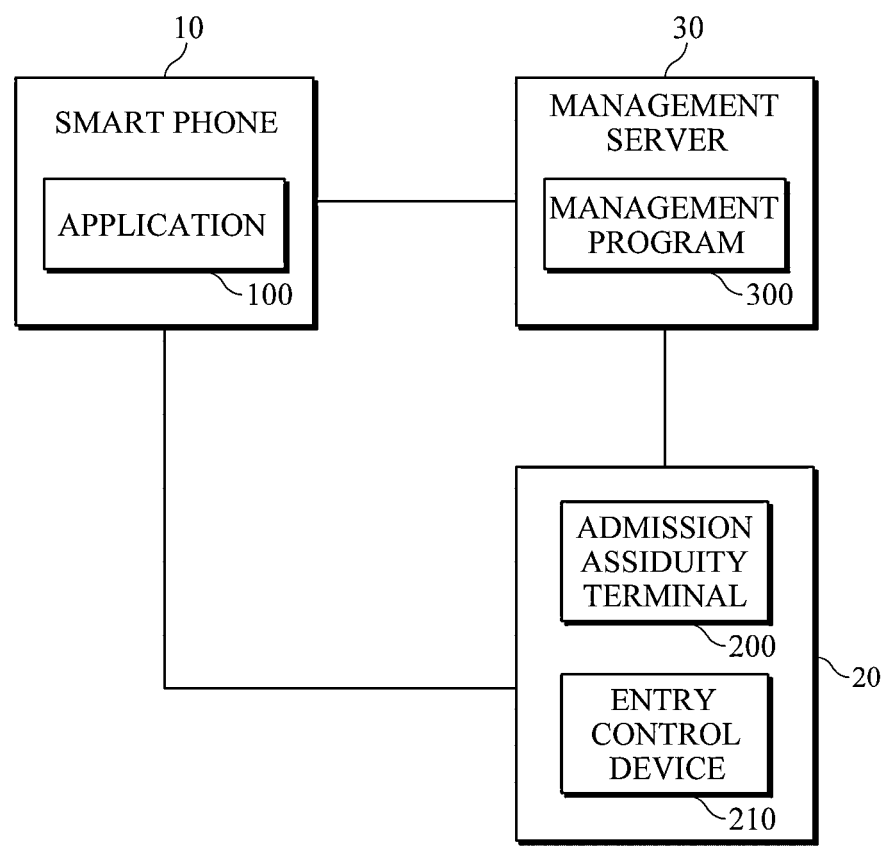
FIG. 2 shows an example of the configuration of a security authentication system.

FIG. 2 shows an example of the configuration of a security authentication system.

As shown in FIG. 1, a security authentication system includes a Smartphone 10, a security authentication device 20 and a management server 30.

The Smartphone 10 includes a Smartphone application 100, and the management sever 30 includes a management program 300. The security authentication device 20 may be an admission assiduity terminal 200 or an entry control device 210. However, the security authentication device is not limited thereto. For convenience sake, the description of this example will be made in relation to the Smartphone 10. However, the present invention is not limited thereto, and may be applied to various types of portable multi-function devices that have a similar function to the Smartphone or are developed in the future.

The Smartphone application 100 searches for the admission assiduity terminal 200 and the entry control device 210 by use of a wireless communication network or a mobile communication network. Thereafter, the Smartphone application 100 attempts to get access to the searched admission assiduity terminal 200 and the entry control device 210.

The management server 30 registers the Smartphone 10 having attempted an access to the admission assiduity terminal 200 and the entry control device 210. That is, the management program 300 of the management server 30 generates an activation code and distributes the generated activation code to the Smartphone 10 and each of the searched admission assiduity terminal 200 and the entry control device 210. The distributing of the activation code is referred to as an activation code registration. A registration process including the generating and distributing of an activation code will be described later in detail with reference to FIG. 3 later.

This example of the management program 300 generates an activation code through a block cipher of performing a symmetric key cipher operation in a block unit that is preliminarily determined. The block cipher is a type of symmetric key encryption where secret information is encrypted in a unit of a block that is preliminarily determined. In the case of the symmetric key cipher, the encrypted information is decrypted using a secret key that is used for the encryption.

According to this example, the activation code includes a first cryptic code and a second cryptic code. The first cryptic code is obtained by encrypting unique information about the Smartphone 10 by use of an internally-defined key of the management program 300, and is stored in the Smartphone 10. The internally-defined key may be changed by the management program 300. Alternatively, the internally-defined key may be transmitted to the admission assiduity terminal 200 and the entry control device 210 and then changed the admission assiduity terminal 200 and the entry control device 210. The second cryptic code is generated by encrypting the first cryptic code by use of an activation code password, and is stored in the admission assiduity terminal 200 and the entry control device 210.

The admission assiduity terminal 200 and the entry control device 210 authenticates the Smartphone 10 for access and limits an access by the Smartphone 10 according to a result of the authentication. A process of authenticating the Smartphone 10 for access will be described later in detail in FIG. 4.

Figure 3:
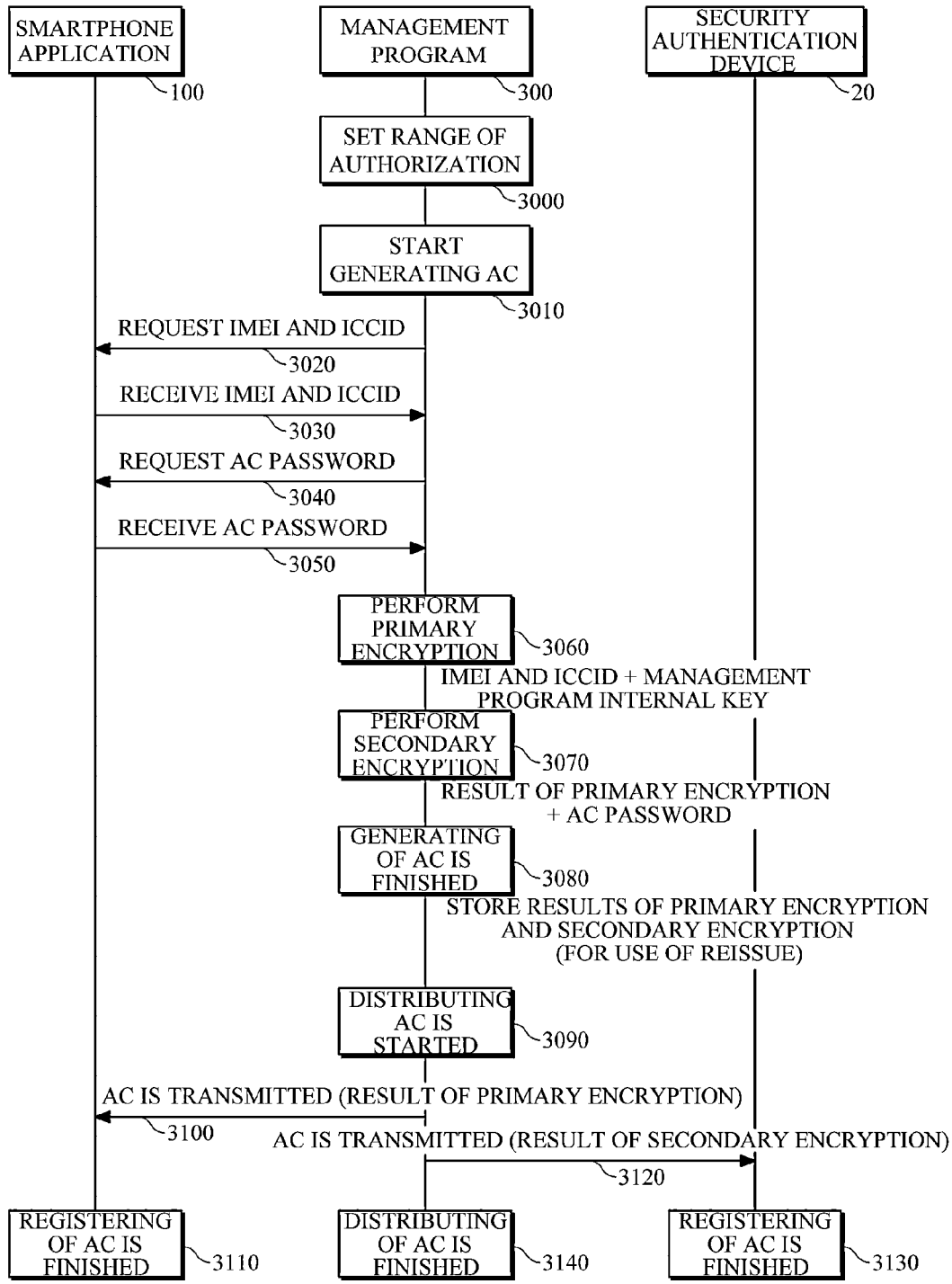
FIG. 3 shows an example of the control flow of a process of generating an activation code and registering the activation code.

FIG. 3 shows an example of the control flow of a process of generating and registering an activation code.

As shown in FIGS. 2 and 3, a range of a search and control authority about an activation code is set by a manager on an activation code generation menu on a screen (3000), and then a menu screen enters an activation mode.

Sequentially, a user of the Smartphone 10 executes the Smartphone application 100 to connect to the management program 300. In general, the connection is established through a wireless communication network, for example, Wi-Fi. If a Public IP is available, a connection is established through a mobile communication network, for example, 3G network.

Thereafter, the manager inputs an activation code generation start command to the management program 300 (3010), thereby requesting unique information about the Smartphone 10, which is used to generate an activation code, from the Smartphone 10. The unique information about the Smartphone 10 may represent at least one of an International Mobile Equipment Identity (IMEI), an Integrated circuit card identifier (ICCID), a Subscriber Identity Module Serial Number (SSN) and an Unique Device Identifier (UDID). For example, the management program 300 requests the IEMI and the ICCID of the Smartphone 10 from the Smartphone application 100 (3020) and receives the requested IEMI and ICCID (3030). The management program 300 having received the IMEI and ICCID requests an activation code password from the Smartphone application 100 (3040). The Smartphone 100 receives the requested activation code password from the user (3050), and transmits the received activation code password to the management program 300.

Then, the management program 300 generates a first cryptic code by encrypting the IMEI and the ICCID by use of an internally-defined key (3060). The internally-defined key is shared only among the management program 300, the admission assiduity terminal 200 and the entry control device 210. The internally defined key is changeable by the management program 300. Alternatively, the internally defined key may be transmitted to the admission assiduity terminal 200 and the entry control device 210 and then changed by the admission assiduity terminal 200 and the entry control device 210.

The management program 300 generates a second cryptic code by encrypting the first cryptic code by use of the activation code password, which has been received from the Smartphone 10 (3070). As the generating of the activation code including the first cryptic code and the second cryptic code is completed (3080), the management program 300 stores the first cryptic code and the second cryptic code. When the user wants to update the activation code, the management program 300 requests the activation code password from the Smartphone 10 and authenticates the updated activation code.

Thereafter, the management program 300 starts distributing the activation code (3090), in which the first cryptic code is distributed to the Smartphone 10 (3100), and the second cryptic code is distributed to the admission assiduity terminal 200 and the entry control device 210 (3120). In this manner, the registering of the activation code in the Smartphone 10, the admission assiduity terminal 200 and the entry control device 210 is finished (3110 and 3130), that is, the management program 300 finishes distributing the activation code (3140).

Figure 4:
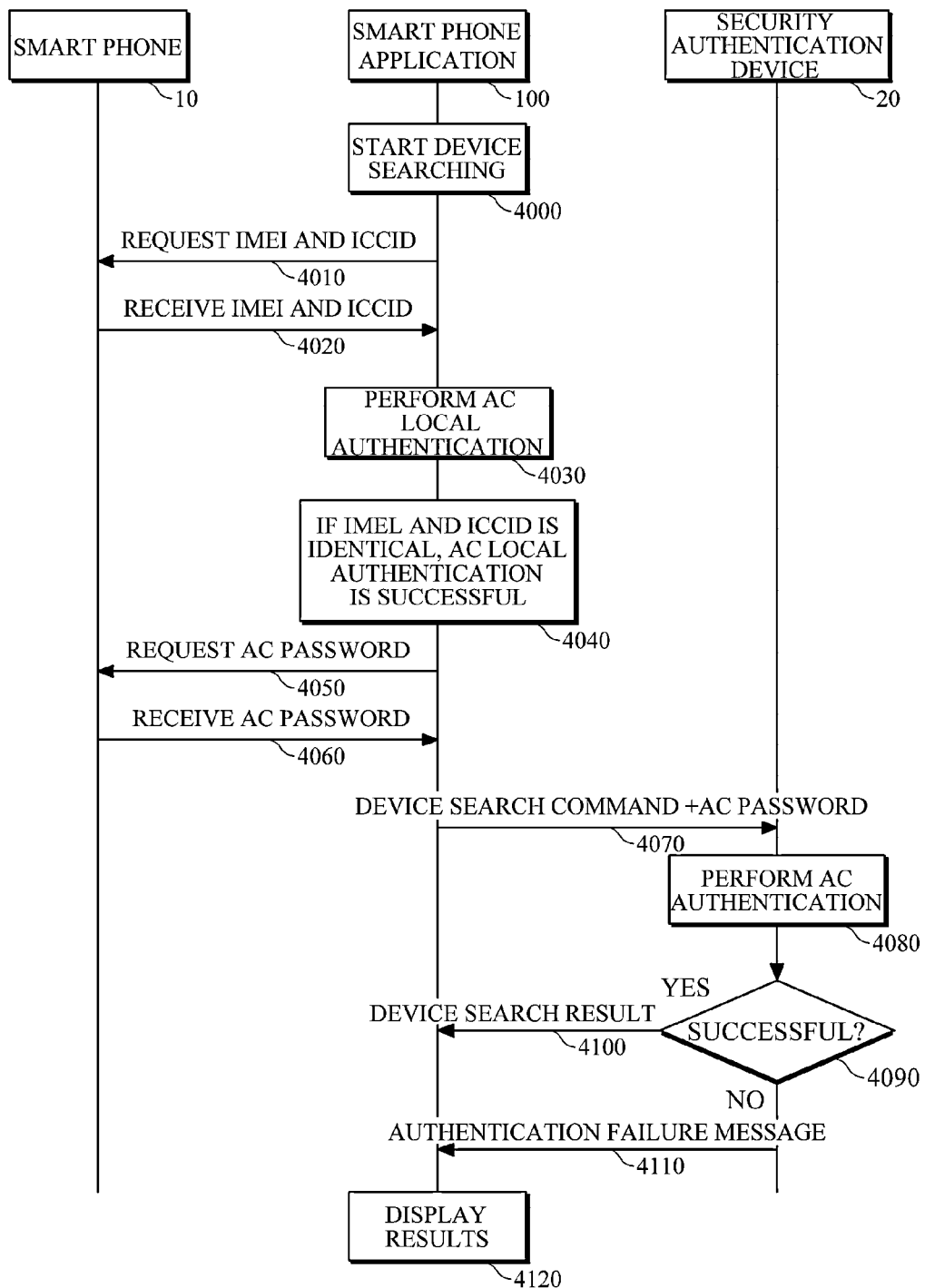
FIG. 4 shows an example of the control flow of a process of authenticating a Smartphone by a device.

FIG. 4 shows an example of the control flow of a process of authenticating a Smartphone by a device.

As shown in FIGS. 2 and 4, when a device search is performed by the Smartphone application 100 (4000), the Smartphone application 100 receives an activation code password from a user, and transmits the received activation code password to the admission assiduity terminal 200 and the entry control device 210 such that the Smartphone is authenticated for device access through a double authentication.

In detail, the Smartphone application 100 requests unique information about the Smartphone 10 (4010) and receives the requested unique information (4020), for example, the IMEI and ICCID. Sequentially, the Smartphone application 100 performs an active code local authentication by use of the received IMEI and ICCID (4030), and if the received IMEI and ICCID is identical to the IMEI and ICCID stored in the Smartphone application 100, it is determined that the activation code local authentication is successful (4040).

Sequentially, the Smartphone application 100 requests an activation code password from the Smartphone 10 (4050) and receives the requested activation code password (4060). Then, the Smartphone application 100 transmits the activation code password to the admission assiduity terminal 200 and the entry control device 210 (4070). Then, the admission assiduity terminal 200 and the entry control device 210 determine whether the received activation code password is identical to an activation code password, which has been stored in the management program, to perform an activation code authentication (4080). If the activation code authentication is successful (4090), the admission assiduity terminal 200 and the entry control device 210 transmit the result of success to the Smart application 100 (4100). If the activation code authentication is failed, the admission assiduity terminal 200 and the entry control device 210 transmit the result of failure to the Smart application 100 (4110). Then, the Smartphone application 100 displays the received result on a screen (4120).

Accordingly, in case the Smartphone 10 is lost, a third party can not get access to the admission assiduity terminal 200 and the entry control device 210 without knowing the activation code password. In addition, a limit of password input attempts may be preliminarily set. If the number of password input attempts exceeds the limit, the activation code is expired. In addition, if an activation code of a registered Smartphone is transplanted to another Smartphone, it is compared whether the IMEI and ICCID of the other Smartphone corresponds to an activation code related information that is stored in the management server. If the IMEI and ICCID of the other Smartphone does not correspond to the activation code related information, a device access by the other Smartphone is not permitted. In the case of an illegal copy mobile phone having the same IMEI, ICCID and activation code as those of an original phone, an access authentication is limited by use of an activation code password FIG. 5 shows an example of a display screen of an application being executed on a Smartphone.

Figure 5:
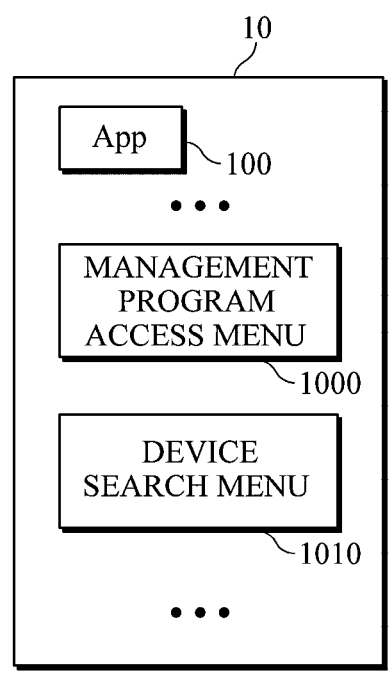
FIG. 5 shows an example of a display screen of an application being executed on a Smartphone.

As shown in FIG. 5, a connection menu 1000 is provided to connect to a management program in the Smartphone application 100 for a user to get an activation code. The connection menu 1000 is configured as an individual component that is separated from a device search menu 1010. Accordingly, the user may connect to the management program regardless of the authentication.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of registering a Smartphone to access a security authentication device in a management server, the method comprising:

generating an activation code comprising a first cryptic code and a second cryptic code, the first cryptic code being generated by encrypting an International Mobile Equipment Identity (IMEI) assigned to the Smartphone using a key that is shared only between the management server and the security authentication device, and the second cryptic code being generated by encrypting the first encrypted code with a password received from the Smartphone; and registering the activation code by distributing the first cryptic code to the Smartphone and distributing the second cryptic code to the security authentication device,
wherein the activation code comprises a list of searchable devices that the Smartphone is able to search for and access and the generating of the activation code comprises setting an authorization range of searchable devices based on the activation code.

2. The method of claim 1, wherein the security authentication device comprises at least one of an admission terminal and an entry control device.

3. The method of claim 1, wherein the first encrypted code includes additional information about the Smartphone including at least one of an Integrated circuit card identifier (ICCID), a Subscriber Identity Module Serial Number (SSN), or an Unique Device Identifier (UDID).

4. The method of claim 1, wherein the generating of the activation code is achieved through a block cipher of performing a symmetric key cipher operation in a block unit.

5. The method of claim 1, wherein the generating of the activation code comprises:
generating the first cryptic code by encrypting the IMEI assigned to the Smartphone by use of an internally-defined key; and
generating the second cryptic code by encrypting the first cryptic code by use of an activation code password that is received from the Smartphone.

6. The method of claim 5, wherein the internally-defined key is changeable by a management program, or transmitted from the management program to the security authentication device and then changed by the security authentication device.

7. The method of claim 5, wherein the internally-defined key is shared only between a management server and the security authentication device.

8. The method of claim 5, wherein the method of registering the Smartphone further comprises
authenticating the updated activation code by requesting the activation code password from the Smartphone, in response to the activation code being updated.

9. The method of claim 1, wherein the generating of the activation code comprises:
receiving the IMEI, which is used to generate the activation code, from the Smartphone;
requesting an activation code password from the Smartphone and receiving the requested activation code password;
generating the first cryptic code by encrypting the IMEI assigned to the Smartphone by use of an internally-defined key; and
generating the second cryptic code by encrypting the first cryptic code by use of the activation code password that is received from the Smartphone.

10. The method of claim 9, wherein the internally-defined key is changeable by a management program, or transmitted from the management program to the security authentication device and then changed by the security authentication device.

11. The method of claim 9, further comprises
authenticating the updated activation code by requesting the activation code password from the Smartphone, in response to the activation code being updated.

12. A method of authenticating a Smartphone at a security authentication device, the method comprising:
generating an activation code of the Smartphone, the activation code comprising a first cryptic code that includes an International Mobile Equipment Identity (IMEI) assigned to the Smartphone being encrypted with a key that is available only to the security authentication device;
requesting an activation code password from the Smartphone and receiving the requested activation code password;
generating a second cryptic code that comprises the first cryptic code encrypted with the activation code password; and
authenticating the activation code by transmitting the second cryptic code to the security authentication device,
wherein the activation code comprises a list of searchable devices that the Smartphone is able to search for and access and the generating of the activation code comprises setting an authorization range of searchable devices based on the activation code.

13. The method of claim 12, wherein the first cryptic code is generated by encrypting the IMEI assigned to the Smartphone by use of an internally-defined key; and
the second cryptic code is generated by encrypting the first cryptic code with the activation code password.

14. The method of claim 13, wherein the internally-defined key is changeable by a management program of or transmitted from the management program to the security authentication device and then changed by the security authentication device.

15. The method of claim 13, wherein the first cryptic code corresponds to a code that is distributed from a management sever to the Smartphone, and the second cryptic code corresponds to a code that is distributed from the management server to the security authentication device.

16. The method of claim 12, wherein the requesting and receiving of the activation code password from the Smartphone comprises:
expiring the activation code if the number of password input attempts exceeds a limit.

17. The method of claim 12, wherein the further authenticating of the activation code comprises:
transmitting the activation code password to the security authentication device through the Smartphone application; and
at the security authentication device, authenticating the activation code if the transmitted activation code password is identical to a stored activation code password.

18. A method to register a Smartphone at a security authentication device in a management server, the method comprising:
generating an activation code comprising a first cryptic code and a second cryptic code
generating the first cryptic code by encrypting an International Mobile Equipment Identity (IMEI) assigned to the Smartphone using a key that is shared only between the management server and the security authentication device;
generating the second cryptic code by encrypting the first encrypted code with a password received from the Smartphone; and
distributing the first cryptic code to the Smartphone and distributing the second cryptic code to the security authentication device,
wherein the security authentication device comprises at least one of an admission terminal and an entry control device, and
wherein the activation code comprises a list of searchable devices that the Smartphone is able to search for and access and the generating of the activation code comprises setting an authorization range of searchable devices based on the activation code.

19. A method of granting an authentication to a Smartphone to access a security authentication device, the method comprising:
- generating an activation code of the Smartphone, the activation code comprising a first cryptic code that includes an International Mobile Equipment Identity (IMEI) assigned to the Smartphone being encrypted with a key that is available only to the security authentication device;
- requesting an activation code password from the Smartphone and receiving the requested activation code password;
- generating a second cryptic code that comprises the first cryptic code that is encrypted with the activation code password; and
- authenticating the activation code by transmitting the second cryptic code to the security authentication device,
- wherein the security authentication device comprises at least one of an admission terminal and an entry control device, and
- wherein the activation code comprises a list of searchable devices that the Smartphone is able to search for and access and the generating of the activation code comprises setting an authorization range of searchable devices based on the activation code.

* * * * *